United States Patent [19]

Le Jeune

[11] 4,232,600
[45] Nov. 11, 1980

[54] PROCESS AND APPARATUS FOR TREATING MATTER COMPRISING A SOLID PHASE AND A LIQUID OR PASTY PHASE

[75] Inventor: Gwénolé Le Jeune, Montreuil, France

[73] Assignee: Societe Civile Hydromer, Paris, France

[21] Appl. No.: 855,299

[22] Filed: Nov. 28, 1977

[30] Foreign Application Priority Data

Dec. 6, 1976 [FR] France .............................. 73 36700
May 4, 1977 [FR] France .............................. 77 13587

[51] Int. Cl.² .......................... B30B 9/02; B30B 9/06
[52] U.S. Cl. ........................................ 100/37; 100/116
[58] Field of Search ................ 100/37, 104, 110, 116, 100/126, 137; 241/1, 5, 15, 30

[56] References Cited

U.S. PATENT DOCUMENTS

| | | | |
|---|---|---|---|
| 2,331,126 | 10/1943 | Loomis | 100/116 X |
| 3,667,688 | 6/1972 | Iannicelli | 241/1 |
| 3,911,807 | 10/1975 | Birnbaum | 100/37 |
| 3,929,061 | 12/1975 | Banks | 100/116 |
| 4,142,933 | 3/1979 | Graham | 100/37 |

Primary Examiner—Edward J. McCarthy
Attorney, Agent, or Firm—James E. Niiles

[57] ABSTRACT

The present invention relates to a process and apparatus for treating matter comprising a solid phase and a liquid phase, according to which said matter is crushed and the crushed matter is sifted under pressure, wherein the sifting under pressure and the crushing of the matter are effected simultaneously by disposing said matter in a closed so-called pressure chamber, causing at least one punch to advance in said chamber and expelling sifted matter through calibrated orifices in the pressure chamber. The invention is applied more particularly to the treatment of household garbage.

24 Claims, 33 Drawing Figures

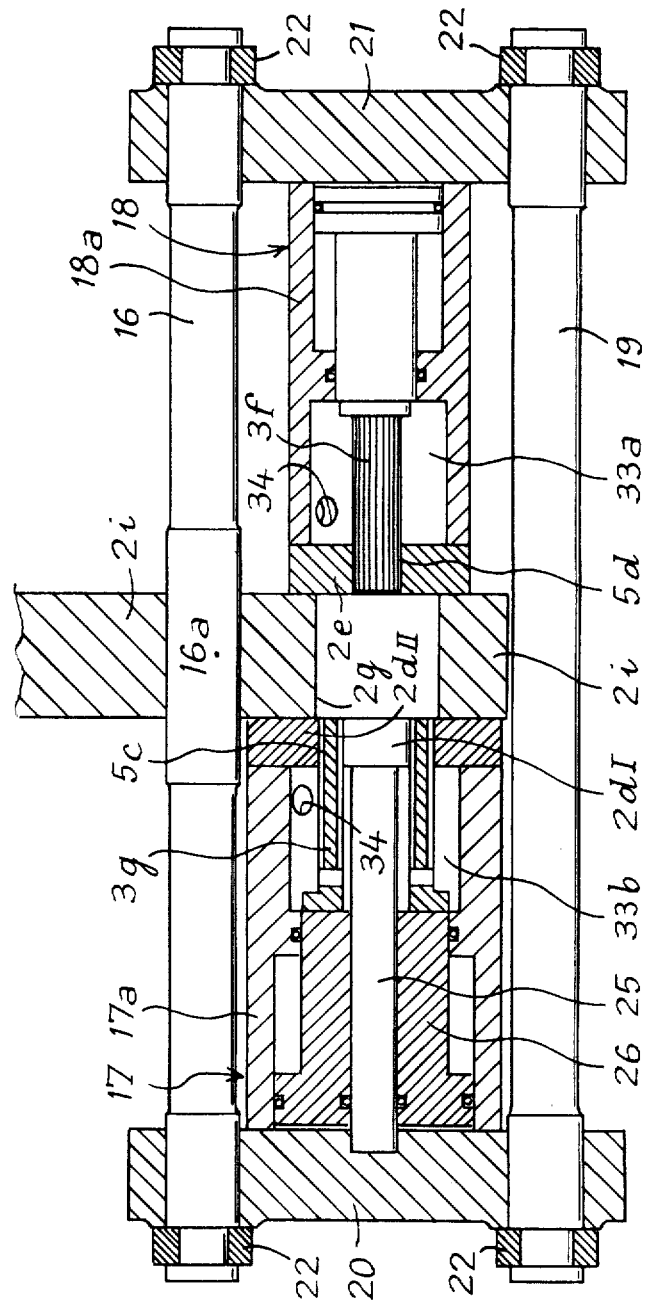

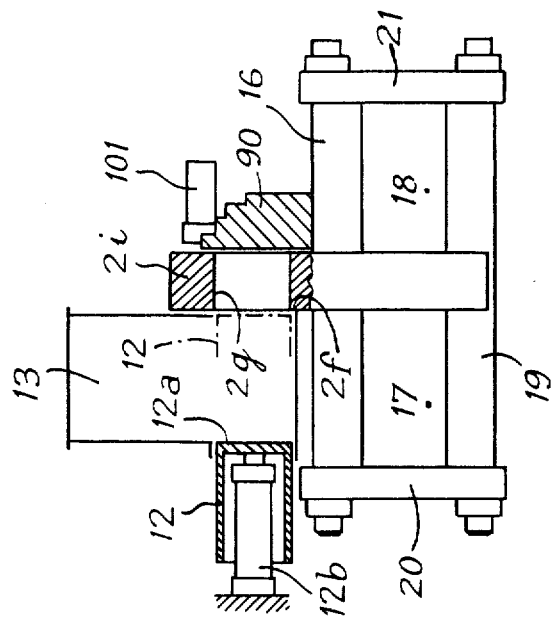
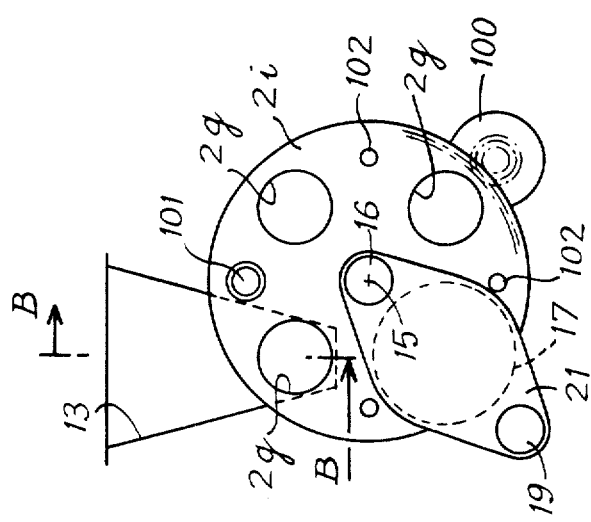
fig.15 b
fig.15 a

PROCESS AND APPARATUS FOR TREATING MATTER COMPRISING A SOLID PHASE AND A LIQUID OR PASTY PHASE

The present invention relates to a process for the treatment of matter comprising a solid phase and a liquid or pasty phase, of the type according to which said matter is crushed and the crushed matter is passed, under pressure, through a sieve.

It has already been proposed to sieve heterogeneous products after crushing to obtain either a product of a controlled granulometry, or a separation of the case product into two parts having different characteristics and use when a certain oversize is allowed. This is the case, for example, when household garbage is crushed before being sieved so as to obtain, on the one hand, a sludge intended for manufacturing a compost for agricultural purposes and, on the other hand, an oversize which may be burnt.

This known manner of proceeding has a certain number of drawbacks.

In particular, this separation, which is made solely from the point of view of granulometry, often does not give a product having the desired quality. Again taking as example the manufacture of compost from household garbage, it is clear that a more and more fine sifting of the crushed product may allow only a growing proportion of mineral products such as ground glass, china, ash, dust to pass, this reducing the content of organic matter in the compost obtained.

In other applications, this known process is highly inefficient; in particular, it is obviously not possible to extract the marrow from crushed bones, by sifting, nor the sap from green wood, even by an improved sifting or filtration such as centrifugation, for example.

It has also been proposed to allow the soft parts of a heterogeneous matter to flow through a grid, or more generally through orifices, by the action of a strong pressure. This method has not proved efficient since this static compression finally affects only the region immediately adjacent the orifices, the one which is affected by a considerable gradient of pressure. Moreover, the orifices are clogged almost from the beginning of filtration.

The invention eliminates these drawbacks and its particular aim is to propose a process and apparatus for efficiently treating the matter in all its volume.

For a process of the type mentioned hereinabove, this purpose is attained in accordance with the invention due to the fact that the sifting under pressure and the crushing of the matter are effected simultaneously by disposing said matter in a closed, so-called pressure chamber, causing at least one punch to advance in said chamber and expelling sifted matter through calibrated orifices in the pressure chamber.

In this way, this process enables the matter to be thoroughly treated, since sifting takes place as the matter is crushed.

This process is advantageously carried out in an apparatus characterised, according to the invention, in that, after having supplied a closed, so-called pressure chamber with the matter to be treated, said matter is crushed and compressed by causing at least one punch to advance in the pressure chamber and, at the same time, the liquid or pasty phase of the matter thus crushed and compressed is made to flow through calibrated passages opening in the pressure chamber, then this punch is withdrawn and the recess made by the penetration of said punch in the mass of matter in the pressure chamber is reabsorbed, reducing the volume of the pressure chamber, and the punch is again made to penetrate the mass of matter.

The matter is advantageously crushed and compressed by causing each of a plurality of punches or groups of punches to advance then withdraw in and from the pressure chamber, alternately and successively, and, each time, by maintaining the other punches in their axial position(s).

Before crushing and sifting the matter under pressure, an excess of liquid is advantageously compacted —and/or compressed—and/or extracted from the matter supplied to the pressure chamber.

This process is advantageously carried out by means of an apparatus according to the invention, comprising:

a pressure chamber defined by a wall, supply means for introducing the matter to be treated into the pressure chamber, means defining calibrated passages connecting the inside of the pressure chamber to at least one chamber for recovering the sifted matter, at least one sectioned crushing and compressing member, axially mobile and engaged in at least one bore which is made in the wall of the pressure chamber and which open out in this latter, this member being adapted to penetrate in the pressure chamber being associated with means for driving it in axial translation in the two directions, and having a cross section smaller than that (or those) of the pressure chamber with respect to any plane perpendicular to the axis of said crushing member, with the result that a penetration of this member in the pressure chamber containing the matter to be treated procures both a crushing and compression of this matter, compensation means distinct from said crushing member for reducing the volume of the pressure chamber in order to reabsorb the recess remaining in the mass of matter in the pressure chamber after each penetration and withdrawal of the crushing member and means for evacuating the dry residue remaining in the pressure chamber after the sifted matter has been extracted.

At least a part of the pressure chamber advantageously has the shape of a bore and the compensation means comprise a so-called compensation piston of section corresponding to that of the bore and adapted to penetrate in said latter.

The compensation means advantageously comprise at least one second crushing member which, like the first, is sectioned, axially mobile and engaged in at least one bore in the wall of the pressure chamber, and which presents a transverse section smaller than that (or those) of the pressure chamber through any plane perpendicular to the axis of said second crushing member.

The bores in which the two crushing members are engaged are advantageously distinct from each other and open out in the pressure chamber on different sides thereof.

The crushing members or the crushing member and the compensation piston are advantageously of parallel axes and their bores open out opposite each other in the pressure chamber.

The calibrated passages advantageously comprise passages made between at least one crushing member and/or the compensation piston and the corresponding bore, these passages preferably being made by means of substantially axial channels made in the lateral surface of the crushing member and/or the compensating piston and/or in the wall of the corresponding bore.

The calibrated passages advantageously comprise at least two groups of passage of different sections from one group to the other and a distinct recovery chamber is associated with each group of passage, in which the passages of said group open out.

At least one of the crushing members is advantageously of substantially annular section.

The crushing members advantageously present different outer diameters.

The inner diameter of one of the crushing members is advantageously at least equal to the outer diameter of the other crushing member.

At least one of the crushing members is advantageously complex and comprises a plurality of parallel punches distributed about the central axis of said complex crushing member, each of these punches being engaged in a corresponding bore in the wall of the pressure chamber.

The apparatus advantageously comprises two opposite complex crushing members of parallel axes, and each punch of a member projects axially into a space located between two adjacent punches of the other member.

Each punch of a complex crushing member advantageously slides by its face turned away from the central axis of said complex crushing member on the side wall of the pressure chamber.

The pressure chamber advantageously comprises a sectioned cavity open at the two ends and made in a body mobile transversely with respect to said cavity between a first position for which said cavity is opposite the crushing member and a second position for which it is opposite means for ejecting the dry residue remaining in said cavity.

The body is advantageously movable in rotation about an axis and it is provided with at least three cavities distributed regularly about this axis and located at equidistance therefrom, each cavity being able to be placed successively in the first and in the second position.

The apparatus advantageously comprises two crushing members adapted to penetrate into the pressure chamber through two opposite faces of said chamber, the body is mounted to move in rotation on an axis constituted by the median part of one of a plurality of columns forming tie-rods connecting together two frame elements on each of which abuts a jack controlling a corresponding crushing member, and each of said opposite faces is constituted by a wall mechanically joined to the fixed element of the corresponding jack.

The or each cavity of the mobile body may advantageously be placed in a third position located upstream of the first position, for which third position said cavity is opposite means for supplying the pressure chamber with matter to be treated.

The sliding face of each punch of a complex crushing member advantageously comprises a longitudinal collecting groove into which open a plurality of transverse channels, said collecting groove opening on one side into a chamber for recovering the sifted matter, and being closed on the other side.

The invention is advantageously applied to the treatment of household garbage with a view to manufacturing an organic product and a fuel. In this case, a crushing member is advantageously used which is provided with channels whose depth is included between 2 and 30 mm and the household garbage is compressed at pressures of between 500 and 2000 bars.

The invention is advantageously applied to the treatment of meat with a view to manufacturing a paste.

The invention is advantageously applied to the treatment of fragments of green trees or bushes with a view to manufacturing a dry oversize rich in cellulose and a liquor rich in organic matter.

The invention is advantageously applied to the treatment of rapid-growth plants such as great reed or sorghum with a view to eliminating the pith of these plants in the sifted matter and manufacturing an oversize rich in cellulose fibres.

The invention is advantageously applied to the treatment of marrow bone with a view to extracting the marrow.

The invention will be more readily understood on reading the following description with reference to the accompanying drawings in which:

FIG. 15 is a view in axial section of the punching station according to an embodiment of the invention;

FIG. 15a is a schematic overall view of an apparatus according to the invention using a drum;

FIG. 15b is a section along B—B of FIG. 15a;

Figure 1:
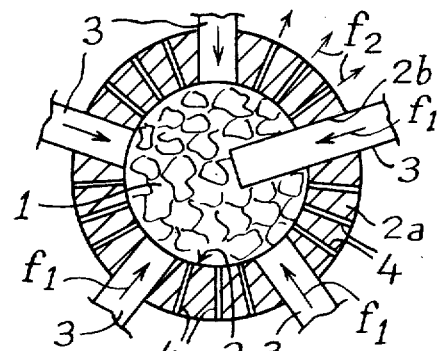
FIG. 1 is a partial schematic view in section of the apparatus according to a first embodiment of the invention.

The process according to the invention is illustrated in its most general form in FIG. 1.

The matter 1 is introduced into a chamber 2 of invariable volume with the exception of the volume displaced by sectioned crusher punches 3; this chamber 2 is closed with the exception of orifices or drains 4 made in the wall 2a of the chamber.

Each punch 3 is guided in a distinct bore 2b opening into the chamber 2 on a distinct side thereof.

On penetrating the chamber 2, the punches simultaneously effect two operations:

The first consists in a grinding of the matter 1 by crushing and cutting.

The second consists in a very considerable rise in the pressure in the chamber 2 in the same manner as the pressure rises in a full barrel when the stopper is driven in.

The punches are of sectioned form, i.e. they have generatrices of slide parallel to their movements in the direction of arrows $f_1$, and a constant cross-section.

Their transverse—or cross-section perpendicular to movement $f_1$ is substantially identical to the section of the bore 2b open at the two ends and pierced in the wall 2a of the chamber 2, in which bores they slide.

At a first appoximation, the rise in pressure is of the order of magnitude of the thrust applied to the crusher punch 3 actuated, divided by the section of said punch. In this way, considerable pressures are obtained with relative weak efforts.

Under the action of this rise in pressure, the sifted matter constituted by the most divided and especially the softest matter leaves (arrow $f_2$) through orifices 4. Its expulsion is as complete as the crusher punch 3 has provoked ruptures, constraints and internal decoherences in the matter 1.

In addition, the possible use of a plurality of punches 3 ensures a mixing of said matter 1 which enables all the mass of said matter to be affected by the sifting treatment.

It is most often desired to isolate an oversize, which is constituted by a phase unsuitable for the use envisaged for the sifted matter, and which cannot pass through the orifices despite the crushing and rise in pressure. In this case, according to the invention, the chamber is provided with any device adapted to evacuate this oversize at the end of the crushing cycle. This device may for example be a door or any known system. Preferred embodiments will be given hereinafter for the means of the invention.

Figure 2:
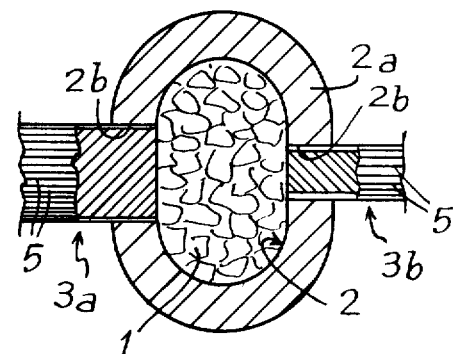
FIG. 2 is a partial schematic view in section of the apparatus according to a second embodiment of the invention.

An important feature of the invention, illustrated in FIG. 2, consists in providing channels 5 along the generatrices of the crusher punches 3a, 3b. These channels 5 constitute orifices—or passages—or drains—through which the sifted matter is expelled, these passages being made between the wall of the bore 2b and that of each channel 5.

This feature has the double advantage of enabling a better extraction of the liquid or pasty phase to be obtained, the channels 5 "seeking" this phase in the very heart of the mass during the movement of the punch 3a, 3b, and of provoking a continuous unclogging of these drains since they are in continual movement with respect to the bore 2b in which the punches slide. Channels 5 are preferably, but not systematically, cut parallel to the movement of the punch 3a, 3b, thus to the generatrices thereof.

It is also possible to provide these channels along the generatrices of the bore 2b in which the crusher punch 3a, 3b slides.

It is likewise possible, when there are a plurality of crusher punches, to give unequal sizes of channels (transverse sections thereof) from one punch to the other so as to collect a plurality of sifted products of different qualities which are, in this case, collected separately. This same arrangement makes it possible to dehydrate very damp matter, with the aid of the use of channels or very fine orifices or even of a simple clearance between the punch and its bore.

This possibility of separation of the raw matter into various constituents or phases according to their aptitude to flow enables the desired final products to be obtained. For each application, there exists a suitable size of orifice or channel such that the desired matter no longer flows beyond a few crushing-compression cycles. It is important, according to the a feature of the invention, that the size of the channels chosen for a given product is that of "saturation" thus determined and not a larger size which would allow an easier extraction of the final products but with the presence of undesirable elements in the sifted matter and existence in the oversize of elements which should have passed with the fluid phase in the sifted matter, due to the insufficient crushing, mixing, pressure and flow time. For each product and for a given characteristic of sifted matter, tests are made according to the invention with different sizes of channels to obtain this point of saturation.

In the treatment of household garbage, it is sought to obtain, on the one hand, a compost constituted by the sifted matter and containing if possible water and organic matter with rapid fermentation, with the exclusion of debris of plastics matter, glass, wood, rags which must remain in the oversize with the scrap iron and paper and cardboard which constitute a dry fuel. Experience has shown that the ideal is to collect 40% to 50% of sifted matter and 50% to 60% of fuel. It is possible, with channels of square or semi-circular section, of 20 mm depth, to obtain this rate of separation between 300 and 500 bars, but the products obtained are not satisfactory: a large proportion of undesirable elements are found in the compost: glass splinters, pieces of rags and plastics, beer bottle caps, etc., the presence of considerable humidity in the combustible oversize (more than 20% water) and the presence of fermentable organic matter which prohibit storage of the combustible oversize.

With channels of 7 mm depth, the separation is perfect but the necessary pressure in this case exceeds 500 bars. Nevertheless it is the size which will be chosen; it is characteristic that the rate of separation does not exceed substantially 50% for a given machine and given waste when the number of crushing cycles is multiplied, as will be seen hereinafter.

It has been seen that the penetration of the channelled crusher-punches 3a, 3b caused the rise in pressure in the chamber and definitively provoked the flow of the softest matter along the channels.

Before treatment of the matter, it is advantageous to fill in the gaps existing between the elements constituting the matter to be treated. According to the invention, this first operation is carried out by a precompression of the materials before the crusher punches are made to advance. In this way, said punches are immediately efficient.

This precompression of the materials in the chamber 2 may be effected in any manner: deformation of the walls of the chamber, charging under pressure of the matter in the pressure chamber before closure of said latter, etc. Preferred examples will be given hereinafter. This precompression is used not only to avoid the loss of efficacy of the crusher punches during the first part of their compression-crushing stroke but also to increase the volumetric capacity of the machine: a greater mass of materials is obtained in the same chamber and to increase the cyclic regularity of the functioning of the machine; the apparent density of the precompressed materials is much more constant than that of the same material in bulk in the raw state.

It has been seen that the introduction of the punches in the pressure chamber simultaneously provoked a crushing of the materials and a rise in pressure in the chamber with flow—or advance—of the softest matter along the channels.

According to an important feature of the invention, the advance movements of the punches are organised so as to provoke a mixing of the matter, in order that the phenomena of flow and crushing effect all the mass of said matter. Generally, these internal movements in the matter are obtained with a plurality of crusher punches, alternately advanced then withdrawn.

The extraction of sifted matter or most fluid matter most often considerably reduces, often of the order of 50%, the total mass of the matter existing in the chamber. It therefore seems judicious to compensate this loss of mass in the chamber by a progressive reduction in the volume thereof so that, upon a fresh advance movement, a punch meets materials of high density and not gaps whose filling may exceed the volumetric capacity of advance of the punch.

FIGS. 2 to 5 illustrate a first manner of carrying out this operation in several cycles and this compensation of volume.

Figure 3:
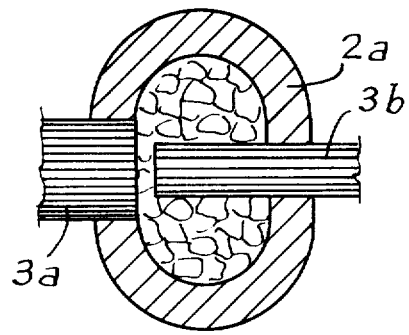
FIGS. 3 and 4 show two stages of the functioning of the apparatus of FIG. 2.
Figure 4:
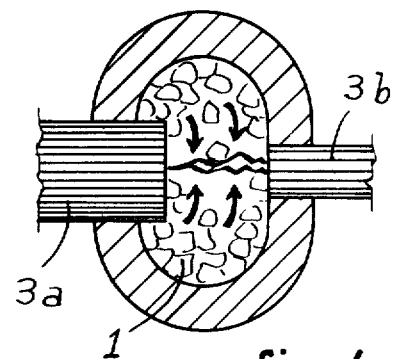

According to FIGS. 2 to 4, the chamber 2, 2a is equipped with a large punch 3a and at least one punch 3b of smaller section, which is guided axially in a bore 2b opening in the chamber 2 opposite the bore 2b of the other punch 3a. The punches 3a and 3b are of parallel and even merged axes.

The matter 1 is introduced, in the precompressed state, into the chamber (FIG. 2).

Figure 5A:
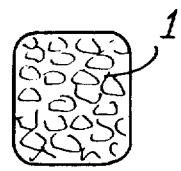
FIGS. 5a to 5h show the successive shapes of the section of the mass of matter contained in the pressure chamber of the apparatus of FIG. 2 during operation.
Figure 5B:
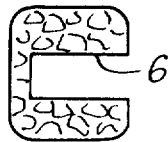
Figure 5C:
Figure 5D:
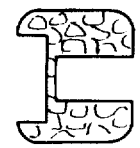
Figure 5E:
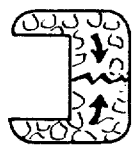
Figure 5F:
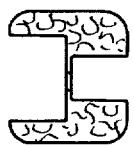
Figure 5G:
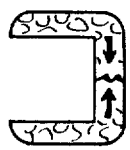
Figure 5H:
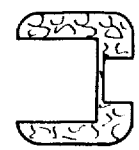

The work cycle is established as follows:

The small punch 3b advances, crushing the matter 1 and causing soft elements to flow through the passages between the punches 3a, 3b and the wall 2a of the chamber (FIG. 3). Then punch 3b withdraws, leaving a blind hole 6 in the mass of matter 1 (FIG. 5b). At that moment, the large punch 3a in turn advances and provokes the subsidence, in the direction of arrows $f_3$, of the matter into the hole 6, so as to fill same (FIGS. 5c and 4).

New cycles of operation then take place, giving the succession of sections of the matter shown in FIGS. 5d to 5h.

Figure 6:
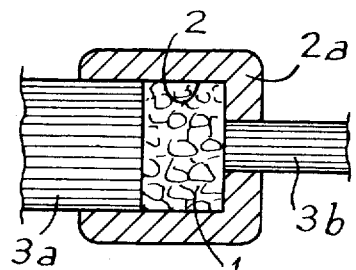
FIG. 6 is a partial schematic view in section of the apparatus according to a third embodiment of the invention.

To better ensure that the whole mass of matter 1 is affected by the treatment, the large punch 3a presents substantially the same section as the chamber 2 which, in this case, is for example cylindrical in section. This embodiment, shown in FIG. 6, has the advantage of allowing a virtually total extraction of the liquid or pasty phase from the matter 1.

Figure 7:
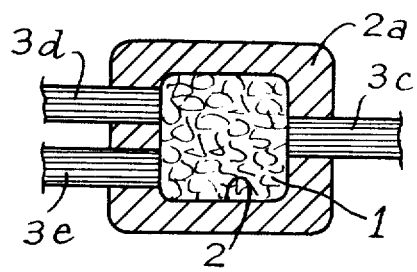
FIG. 7 is a partial schematic view in section of the apparatus according to a fourth embodiment of the invention.
Figure 8A:
FIGS. 8a to 8e show the successive shapes of the section of the mass of matter contained in the pressure chamber of the apparatus of FIG. 7 during operation.
Figure 8B:
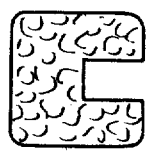
Figure 8C:
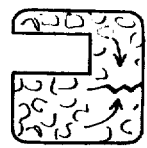
Figure 8D:
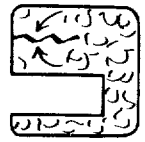
Figure 8E:
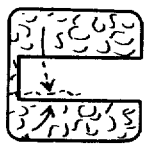

Another method according to the invention for obtaining this trituration—or mixing—of the mass 1, consists in using a plurality of punches, of which the sum of the volumes displaced at the end of stroke is at least equal to the volume of sifted matter which it is desired to extract. FIG. 7 illustrates such an arrangement in its most general form, a more precise case of application thereof will be described hereinafter.

According to an example of this method, the chamber 2 is equipped with three punches 3c, 3d and 3e of parallel axes, the punches 3d and 3e being guided in bores 2b opening in the chamber 2 opposite the bore 2b of the punch 3c.

The punches 3c, 3d, 3e are driven into the mass of matter 1 one after the other up to the limit of the force which may be applied thereto. Each time, a certain quantity of sifted matter is extracted. Each punch is withdrawn at that moment and another effects the same movement. A fresh advance of the same punch may go further and affect matter which was not in contact with said punch at the first movement. During the advance of the punch, the others are maintained axially.

The succession of the sections of the mass of matter 1 obtained is shown in FIG. 8.

Without departing from the scope of the invention, one or more punches may be maintained in advanced position when the volume extracted from the mass to be treated approaches or exceeds the volume displaced by a punch.

The following description concerns material dispositions applied to the apparatus for carrying out the process according to the invention.

Figure 9:
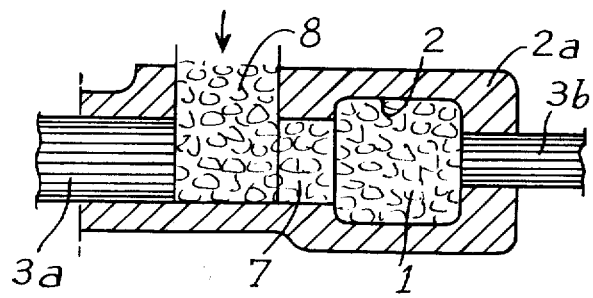
FIG. 9 is a partial schematic view in section of the apparatus according to a fifth embodiment of the invention.
Figure 10:
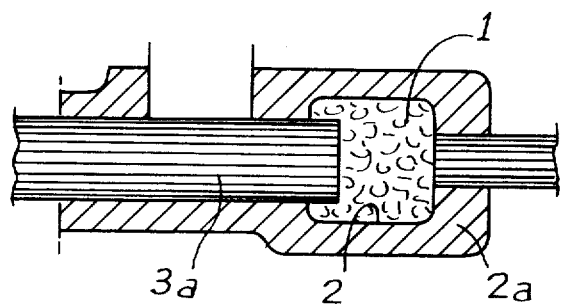
FIG. 10 shows the device of FIG. 9 in which the ramming piston is in advanced position.

When the work cycle which makes use of a large compensator punch 3a is applied, it is advantageous to use said latter, due to its large transverse section, both as element for filling the pressure chamber with matter to be treated and as "mobile door" adapted to obturate the opening 7 through which the matter to be treated is introduced into said chamber 2. FIGS. 9 and 10 show such an arrangement.

The punch 3a is adapted to withdraw from the chamber 2, uncovering an opening 7 through which the matter 1 is introduced after having passed into the space 8 left free by the extreme withdrawal of the punch 3a. FIG. 10 shows how the punch 3a has returned into a position where it acts its usual role of crushing and compensation. In particular, it is this punch which also ensures the role of precompression defined previously.

Figure 12:
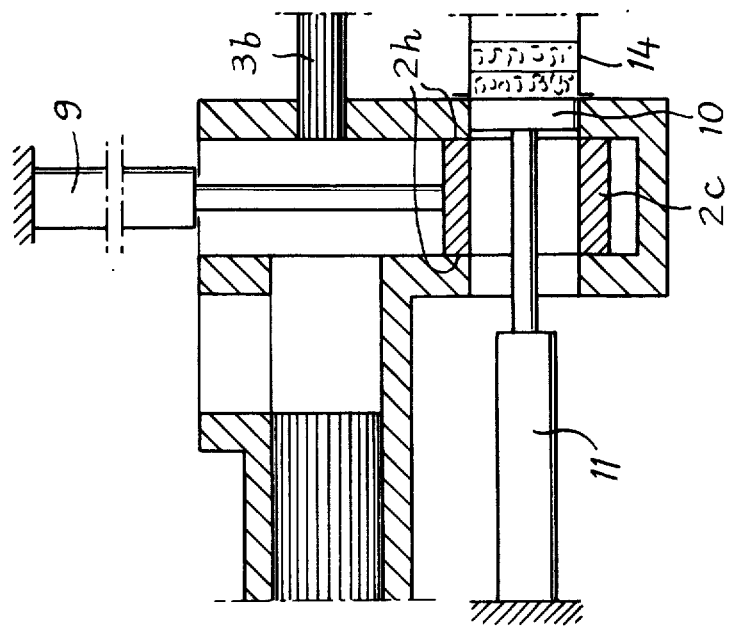
FIG. 12 shows the apparatus of FIG. 11 in which the slide valve is in position of ejection of the oversize.
Figure 11:
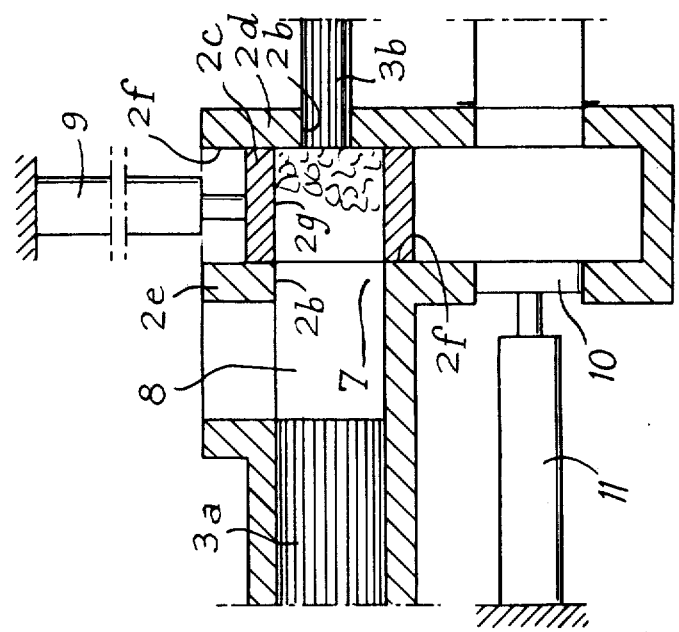
FIG. 11 is a partial schematic view in section of the apparatus according to a sixth embodiment of the invention.

FIGS. 11 and 12 show another embodiment according to which the wall of the chamber is no longer mechanically unitary but it is constituted by three parts: a mobile part 2c constituting the side wall of the chamber, and two parts 2d and 2e located on either side of said part 2c. Parts 2d and 2e are fixed and each comprise the bore 2b in which slides the corresponding punch 3a, 3b and the opposite faces 2f of these fixed parts 2d and 2e are flat, parallel to each other and perpendicular to the axis of the punches 3a, 3b.

The part 2c defines a sectioned cavity 2g coaxial with the punches 3a and 3b. This part 2c slides with a slight clearance or with no clearance, tight or not to the liquid or pasty phase, between the two fixed parts 2d and 2e. FIGS. 11 and 12 show how the mobile part 2c is moved, for example by a hydraulic jack 9, so as to bring the oversize, at the end of operation of the machine, in front of a shield 10 animated by an ejector jack 11. This part 2c then constitutes a slide valve with two parallel extreme faces 2h sliding between two likewise parallel walls, one bearing the bore 2b in which the large punch 3a slides, the other bearing the or each bore 2b in which the or each small punch 3b slides.

Figure 13:
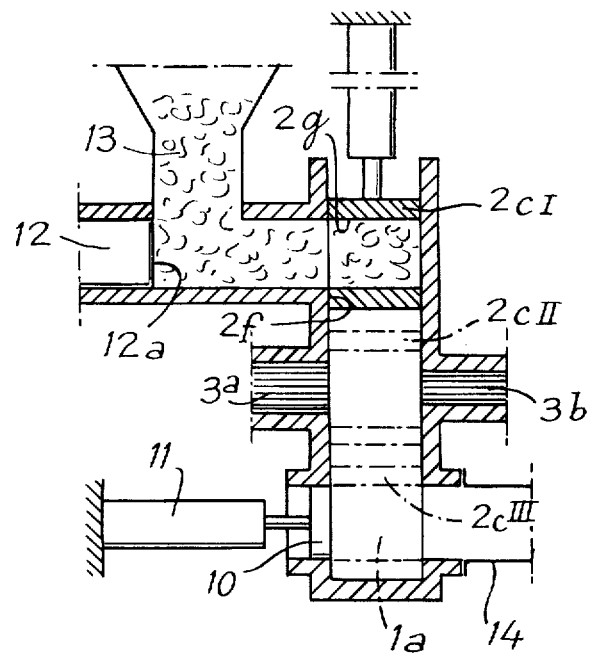
FIG. 13 is a partial schematic view in section of the apparatus according to a seventh embodiment of the invention.

According to another preferred arrangement of the invention, the part of the chamber constituting the slide valve 2c may be displaced in at least three positions:

In a first position 2cI, the cavity 2g which it constitutes is placed in front of a ramming station, as shown in FIG. 13.

A ramming piston 12 animated by a reciprocating movement rams the cavity 2g of the slide valve 2c by pushing the matter to be treated introduced through hopper 13. One or more strokes of the ramming piston 12 may be necessary for filling the pressure chamber with precompressed matter. After this ramming, the piston 12 is generally left and maintained in a position such that its front face coincides with the plane 2f of the fixed part 2e nearest the entrance 7 of the pressure chamber during the translation of the slide valve 2c, so as to avoid the shearing of the compressed matter in the cavity 2g, which could be pushed back due to their elasticity.

In a second position 2cII, the cavity 2g, full of matter 1, is placed in front of the crusher punches 3a, 3b, acting from the two parallel faces 2f opposite the load 1 and serving as plane of slide for the slide valve 2c. The volume displaceable by the group of punches will generally be greater than the volume of sifted matter which it is desired to extract. The second cycle described hereinabove with reference to FIGS. 7 and 8 will therefore generally be used.

In a third position 2cIII, the cavity 2g carrying the oversize 1a is placed in front of the shield 10 of the ejector jack 11 which pushes the load 1a into an evacuation tube 14 whose section is substantially identical to that of the cavity 2g.

According to another preferred arrangement of the invention, at least three cavities 2g are made in a rotary drum 2i and the different stations: cramming, separation of the phases and ejection are distributed circularly about the axis of rotation 15 of the drum 2i. The operations corresponding to these stations may consequently be carried out simultaneously.

Figure 14:
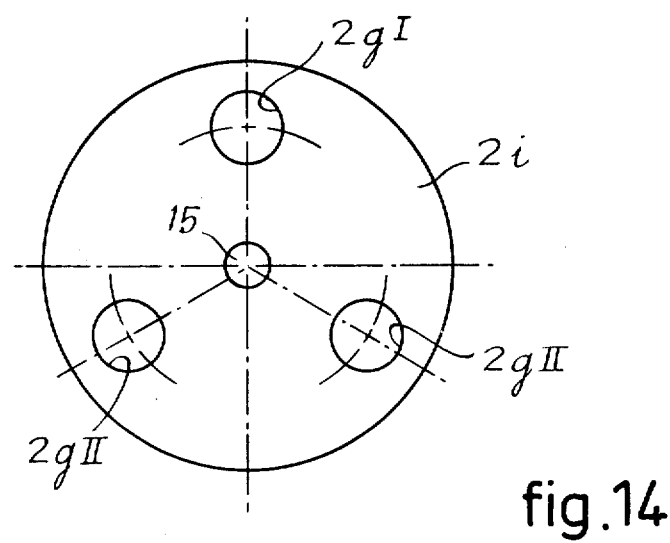
FIG. 14 is a front view of a drum according to an embodiment of the invention.

FIG. 14 shows such an arrangement.

The drum 2i rotates about axis 15. The three cavities 2gI, 2gII, 2gIII are equidistant from the centre of rotation 15 and regularly spaced from one another. According to the invention, the axis of one cavity, for example 2g I, merges with the axis of the cramming piston 12 described previously, the axis of cavity 2gII is merged with the axis of the punching station and the axis of cavity 2gIII merges with the axis of the ejection jack 11. In the case of the example shown, a rotation of 120° about the axis 15 brings the crammed matter 1 in front of the punching station, the oversize 1a in front of the ejection and an empty cavity in front of the cramming piston 12. The operations of the work stations may therefore be simultaneous, the drum 2i always rotating in the same direction.

It is possible to provide the drum with more than three cavities and it is often advantageous to make four, two ejection stations often being useful if the blocks of oversize 1a are directly taken to a complementary machine (incinerator for example). In this latter case, the rotation is made through 90° and the cramming, punching (separation of phases) and ejection stations are spaced out angularly by 90°.

FIG. 15 shows a device preferably actuating the rotary drum 2i.

The drum 2i rotates about a column 16 forming axis for said drum 2i. Two opposite jacks 17 and 18 actuate the crusher punches (3f and 3g) located opposite the cavity 2g placed in crushing punching-position. According to the invention, this column 16, associated with one or more other columns 19 supports in traction the thrust exerted by the jacks 17 and 18 either by a front flange or, preferably, by a rear base plate 20 and 21. In this way, the plates 20 and 21 are mechanically connected together by the columns 16, 19 to which they are fixed by means of screws 22, and they serve as abutment for jacks 17, 18 controlling the movement of the crushing and mixing punches. In this way, except when withdrawing, the jacks 17 and 18 work only in axial thrust, this simplifying their design. The other stations, cramming and ejection in particular, may have drive members connected to the columns, and to the central column 16.

Figure 16:
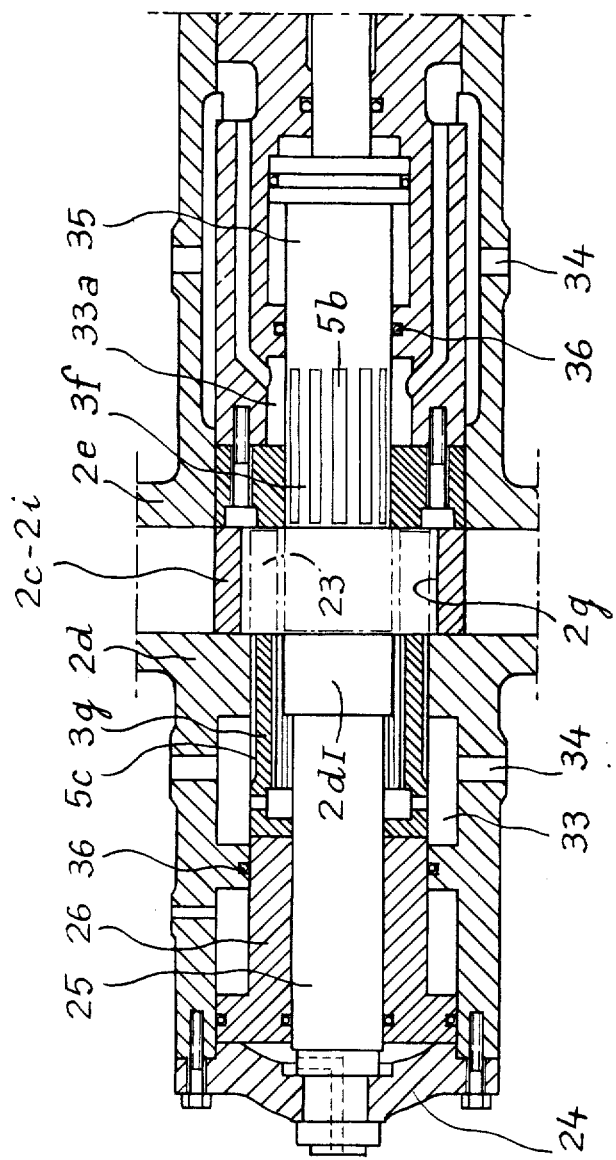
FIG. 16 is a view in axial section of the punching station according to another embodiment.

According to a particular feature of the invention shown in FIGS. 15 and 16, the matter 1 contained in the chamber is crushed by two opposite punches 3f, 3g, each passing through one of the walls 2e, 2d serving as guide for the slide valve 2c or drum 2i. The first punch or central punch 3f is cylindrical, with a smaller diameter than that of the cavity 2g and coaxial with respect thereto; the second punch 3g is annular.

The central punch 3f in extreme advanced position (in broken lines in FIG. 16) leaves an annular space 23 between itself and the side wall of the chamber 2g; this space 23 may be occupied at least partially by the annular punch in extreme advanced position. The portion 2dI of the wall 2d subjected to the pressure prevailing in the chamber transfers its effort on a piece 24 of the frame of the apparatus (casing or bottom wall of the pressure chamber of the jack as described previously) by means of a column 25 which passes through a hollow piston rod 26 of the jack 17.

Figure 17:
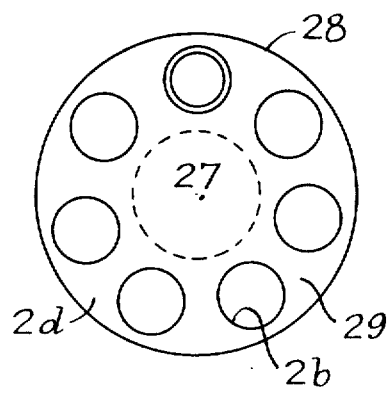
FIG. 17 is a front view of the fixed wall obturating an open end of a cavity of the slide valve of the apparatus according to an embodiment of the invention.

In order to avoid this column 25 which may complicate the design of the jack and also to improve the crushing and possibilities of extraction of the sifted matter, the annular punch 3g may be replaced by a plurality of small punches adapted to penetrate into the same space 23 about the central punch 3f. In this case, FIG. 17 shows a front view of the part of the wall 2d subjected to pressure.

The central zone 27 of this part of wall is joined to the peripheral zone 28 due to the connections 29 existing between the bores 2b through which the punches slide. These punches may each be constituted by a branch of a complex punch having an axis of symmetry.

Another preferred feature according to the invention consists in using two identical opposite complex punches (thus interchangeable) each having an axis of symmetry and adapted to interpenetrate each other. Instead of these complex punches, identical punches, independent of each other, may of course be used to replace each branch of complex punch.

Figure 18:
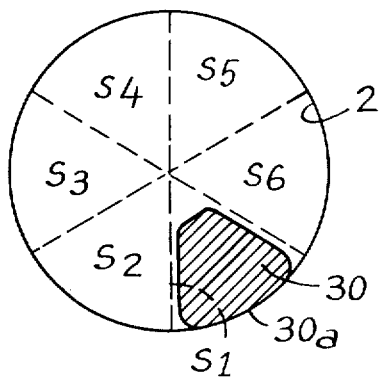
FIG. 18 is a diagram showing the arrangement of two opposite complex crushing members.

In the case of the example shown in FIG. 18, the cavity 2, constituting the pressure chamber, is a cylinder with director circle 1 and three punches per end face of the cavity 2 have been provided. Under these conditions, which are non-limiting and in accordance with the invention, the geometrical form of the punches is defined as follows:

The director circle of the cavity 2 is subdivided into six equal sectors $S_1$ to $S_6$. Each wall $2d$, $2e$ bears three punches 30 whose section is inscribed in three of the sectors 2, 4 and 6 for example.

At maximum, the section of the punches 30 is equal to that of the sectors $Si$ and in this case, a volume of extraction of sifted matter of 100% may be obtained, the six punches 30 being capable of penetrating together over the whole extent of the pressure chamber.

According to a feature of the invention, the outer face $30a$ of the punches 30 may slide on the side wall of the chamber 2. Due to this feature, the punches 30 resist much better the radial forces of flexion which are applied thereto when the advance in the chamber, applied against the side wall of the chamber.

Figure 19:
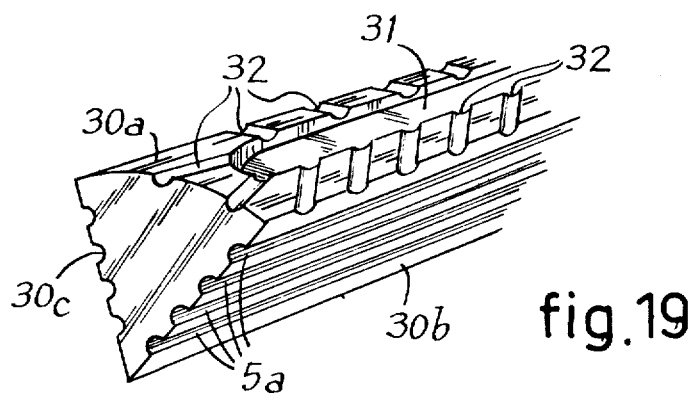
FIG. 19 is a partial view in perspective of a punch forming part of a complex crushing member according to an embodiment of the invention.

The outer rubbing surface $30a$ may be arranged as shown in FIG. 19.

In the rubbing surface $30a$ is hollowed out a wide groove or channel 31. Side channels 32 supply this groove 31 with fluid matter when the matter is compressed. Longitudinal channels $5a$ are cut in the other faces $30b$, $30c$ of the punch. The groove 31 does not open directly at the front, but only via channels 32, the groove 31 opening at the rear of the punch 30 beyond the adjacent side wall $2d$, $2e$ of the chamber, so as to allow the recovery of the sifted matter.

This arrangement is also suitable for other shapes of punches, on condition that part of their surface is in contact with the side wall of the cavity 2, in which part the groove 31 is hollowed. This arrangement enables the extraction of the sifted matter to be improved.

Still with a view to improving the extraction, it is generally advantageous, without departing from the scope of the invention, for the longitudinal channels 5 or $5a$ not to open out at the front of the punches (cf. also channels $5b$ of FIG. 16).

Figure 20:
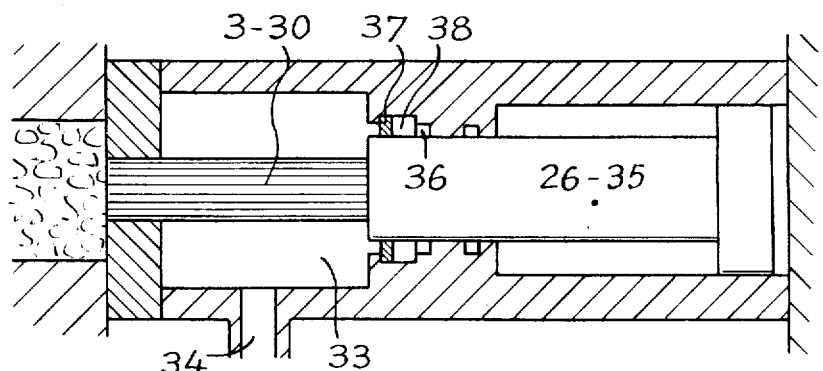
FIG. 20 is a partial view in axial section of a crushing member and its control jack according to an embodiment of the invention.

The sifted matter is collected beyond the wall $2a$ of the chamber 2 in accordance with FIGS. 16 and 20.

After having flowed along the channels 5, $5b$, $5c$ of the or each punch 3 or 30, the sifted matter opens into a recovery chamber such as $33a$ or $33b$ and is evacuated to the outside through a pipe 34.

FIG. 16 shows that the channels $5b$ of the punch $3f$ are of section larger than that of the channels $5c$ of punch $3g$. In this way, sifted matter of different qualities may be collected in each of the distinct chambers $33a$, $33b$ for recovering sifted matter, in each of which open the passages constituted by the channels, $5b$ and $5c$ respectively.

As the matter is often abrasive, the piston rod 26 or 35 acting on said punch and especially the scraper joint 36 associated with this rod are protected by a sliding ring 37 generally made of cast iron, adjusted on the rod 26–35 and arranging a chamber 38 in which is injected a lubricating product under a pressure higher than that of the matter extracted and compatible therewith. In the case of the treatment of household garbage, for example, a fermentable animal or vegetable fat will be injected.

According to another feature of the invention, the cramming and precompression station is fitted with a separate system for draining the liquids which may flow during this precompression. In particular, this system may be constituted by channels in the cramming piston, of which channels the section is chosen in order to allow the passage only of the liquid to be eliminated which is located in the matter introduced in the machine.

In addition, it is advantageous to provide the wall opposite the cramming piston with a punch further adapted to withdraw beyond the plane of slide, for example, under the action of the pressure of the matter so as to allow the flat front face of the cramming piston to arrive at the end of stroke in coincidence with the plane of translation of the slide valve or of the drum.

FIGS. 15, 15a and 15b show by way of preferred but non-limiting example, a press adapted to treat the products according to the process of the invention, under good conditions. The matter to be treated is deposited in the hopper 13. A cramming piston 12 animated by a jack $12b$ sweeps the bottom of the hopper 13 so as to correctly supply, through one of its open ends, a cylindrical cavity $2g$ made in the rotary slide valve 2; the other open end of this cavity being obturated by fixed wall 90. The cramming piston 12 is cylindrical, substantially of the same section as the cavity $2g$ and its extreme advance position is such that the plane of the nose of the piston $12a$ coincides with the plane of friction $2f$ of the slide valve $2i$. On advancing, the piston 12 pushes in front of it the matter to be treated and introduces it into the cavity $2g$. It may be necessary to effect several advances of the piston 12 to fill the cavity $2g$ sufficiently. According to a feature of the invention, this filling station 12, 13 is also a station for drying the matter introduced into the cavity $2g$. To this end, the cavity $2g$ may be provided with orifices of small dimensions (not shown) enabling the water to flow away under the action of the pressure. The hydraulic jack $12b$ animating the piston 12 will generally be dimensioned so that it gives a frontal pressure of the order of 30 bars. At each advance of the cramming piston 12, the pressure rises in the cavity $2g$. When said latter is sufficient, the piston 12 is immobilised in front so that the plane of its front face $12a$ coincides with the plane of friction $2f$ of the slide valve $2i$. At this moment, said slide may move without the matter contained in the cavity $2g$ being able to expand and flow back to the outside. Household garbage in particular is still very elastic at 30 bars.

Apart from a certain dehydration, the cramming precompression has for an important effect to reduce the space between the solid elements constituting the household garbage. This results in an increase in the apparent density of the matter and an almost perfect degassing.

The rotary slide valve $2i$ is then displaced by a motor 100 about its axis 15 by a quarter turn, since, in the example of the drawing, four identical cavities $2g$, regularly distributed about this axis 15, are provided in the slide valve $2i$. An empty cavity $2g$ therefore presents itself in front of the piston 12 and may be filled again whilst the full cavity $2g$ is positioned exactly in alignment between the two punches $3f$ and $3g$ (FIG. 15). A jack 101 introduces a pin (not shown) in a bore 102 of the slide valve $2i$ so as to position it exactly despite the considerable lateral stresses which may be produced on the slide valve during the punchings.

FIG. 15 shows that the drum $2i$ is mounted for rotation on a spindle $16a$ which is constituted by the median part of a column 16 connecting together, in cooperation with a second column 19, the two frame elements—or jack bottom—20 and 21 on each of which the casing $17a$, $18a$ of the corresponding jack 17, 18 abuts.

The punches $3f$ and $3g$ being coaxial with respect to each other and with the cavity $2g$ in punching position, the efforts of reactions supported by the jacks 17 and 18 are solely axial and are transmitted totally to the columns 16 and 19 forming tierods. In this way, any fatigue of the fixation of the casings 17a, 18a on the adjacent bottoms 20, 21 is thus avoided. Moreover, the open end faces of the cavity 2g are obturated by parallel, fixed walls 2dI, 2dII and 2e which are mechanically joined to the casing 17a, 18a of the adjacent jack 17, 18. In this way, the effort exerted by the compressed matter in the cavity 2g on said fixed calls 2dI, 2dII and 2e are also totally transmitted to the columns 16 and 19. All these characteristics contribute to simplifying and lightening the construction of the punching station and, in particular, of the jacks 17 and 18 and their assembly on the frame 16, 19, 20 to 22.

EXAMPLE 1

Household garbage has been treated by crushing-sifting according to the invention.

Under a pressure of the order of 1000 bars and with channels of the order of 7 mm depth, a compost of good quality and a dry combustible oversize of high calorific power have been obtained. Depending on the sought-after quality, the size of the channels may be increased up to several tens of millimeters; in this case, the pressure of extraction may be lower than 1000 bars. Inversely, finer channels require pressures which may be higher.

EXAMPLE 2

Pieces of meat of low commercial value, particularly containing bones, teeth, hair and hide have been treated. A meat paste is obtained having no undesirable hard elements and an oversize which may be treated further, particularly converted into animal black. The pressures and dimensions of channels used are of the same order as those of the preceding Example.

EXAMPLE 3

Green wood, bushes, pruned leafy wood, bark, etc. have been treated, and products have been obtained ranging from a liquor containing the sap and a pulp containing cellulose, depending on the pressure and size of the channels used. The oversize is constituted by crushed dry wood which may be used in the conventional applications: direct fuel, in the form of wood charcoal, paper pulp, etc. It is advantageous to collect only the liquor rich in carbohydrates, proteins and fats, which may be used for food or chemical applications, without allowing an appreciable quantity of cellulose to pass, which is collected in the oversize. In this case, the size of the channels must be very small: from about 2 to 6 mm depth according to the matter and results desired. The punches may possibly be smooth, the liquids being expressed through the clearance between punch and wall without departing from the scope of the invention.

EXAMPLE 4

Plants have been treated of the great reed or sorghum type, which are plants with rapid growth whose cellulosic fibres are intended for the manufacture of cellulose fibres which may give paper pulp. The crusher-sifter according to the invention enables the undesirable pith to be extracted and the utilisable fibres to be collected in the oversize. The pressures and sizes of the channels used are of the same order as those used in the treatment of green wood.

EXAMPLE 5

Fodder crops, particularly lucern and dry leaves of Indian corn have been treated. There are two possibilities:

With a view to dehydrating these products, punches with very fine channels or smooth punches are used; with larger channels of one to a few millimeters depth, a pulp is extracted which may be treated further, rich in sugar and proteins.

The oversize constitutes dry, dense fodder which no longer ferments and may be stored.

EXAMPLE 6

Marrow bones have been treated so as to extract the marrow therefrom, particularly for food, without using solvents. The oversize contains the hard part of the bones and may be treated by pyrolysis in particular.

What is claimed is:

1. An apparatus for carrying out a process for the treatment of matter comprising a solid phase and a liquid or pasty phase and of the type according to which said pasty phase is crushed and the resulting crushed matter is sifted under pressure, said apparatus comprising:

a pressure chamber defined by a wall, supply means for introducing the matter to be treated into the pressure chamber, means defining calibrated passages connecting the inside of the pressure chamber to at least one chamber for recovering the sifted matter, at least one sectioned crushing member, axially mobile and engaged in at least one bore located in said wall of said pressure chamber and which bore opens outwardly from said chamber, said crushing member being adapted to penetrate in the pressure chamber and having means for driving said member in axial translation in two directions said member having a cross section smaller than said pressure chamber with respect to any plane perpendicular to the axis of said crushing member, whereby penetration of said member in the pressure chamber containing the matter to be treated procures both a crushing and compression of said matter, the withdrawal of the crushing member forming a recess in said mass of matter, compensation means distinct from said crushing member for reducing the volume of the pressure chamber in order to reabsorb the recess remaining in the mass of matter in the pressure chamber after each penetration and withdrawal of said crushing member and means for evacuating the dry residue remaining the pressure chamber after the sifted matter has been extracted.

2. The apparatus of claim 1, wherein at least a part of the pressure chamber has the shape of a bore and the compensation means comprise a compensation piston of cross section corresponding to that of the bore and adapted to penetrate in said latter.

3. The apparatus of claim 1, wherein the compensation means comprise at least one second crushing member which, like the first, is sectioned, axially mobile and engaged in at least one bore in the wall of the pressure chamber, and which presents a transverse section smaller than said pressure chamber through any plane perpendicular to the axis of said second crushing member.

4. The apparatus of claim 3, wherein the bores in which the two crushing members are engaged are distinct from each other and open out in the pressure chamber on different sides thereof.

5. The apparatus of claim 2, wherein said crushing member and the compensation piston are of parallel axes and their bores open out opposite each other in the pressure chamber.

6. The apparatus of claim 1, wherein the calibrated passages comprise passages made between at least one crushing member and said compensation means and the corresponding bore, these passages formed by substantially axial channels made in the lateral surface of the crushing member and said compensating means and the wall of the corresponding bore.

7. The apparatus of claim 1, wherein the calibrated passages comprise at least two groups of passage of different sections from one group to the other and a distinct recovery chamber is associated with each group of passage, in which the passages of said group open out.

8. The apparatus of claim 1, wherein at least one of the crushing members is of substantially annular section.

9. The apparatus of claim 1, wherein the crushing members present different outer diameters.

10. The apparatus of claim 8, wherein the inner diameter of one of the crushing members is at least equal to the outer diameter of the other crushing member.

11. The apparatus of claim 1, wherein at least, one of the crushing members is complex and comprises a plurality of parallel punches, distributed about the central axis of said complex crushing member, each of these punches being engaged in a corresponding bore in the wall of the pressure chamber.

12. The apparatus of claim 11, comprising two opposite complex crushing members of parallel axes, and each punch of a member projects axially into a space located between two adjacent punches of the other member.

13. The apparatus of claim 11, wherein each punch of a complex crushing member slides by its face turned away from the central axis of said complex crushing member on the side wall of the pressure chamber.

14. The apparatus of claim 1, wherein the pressure chamber comprises a sectioned cavity open at the two ends and made in a body mobile transversely with respect to said cavity between a first position for which said cavity is opposite the crushing member and a second position for which it is opposite means for ejecting the day residue remaining in said cavity.

15. The apparatus of claim 14, wherein the body is movable in rotation about an axis and it is provided with at least three cavities distributed regularly about this axis and located at equidistance therefrom, each cavity being able to be placed successively in the first and in the second position.

16. The apparatus of claim 15, comprising two crushing members adapted to penetrate into the pressure chamber through to opposite faces of said chamber, the body is mounted to move in rotation on an axis constituted by the median part of one of a plurality of columns forming tie-rods connecting together two frame elements on each of which abuts a jack controlling a corresponding crushing member, and each of said opposite faces is constituted by a wall mechanically joined to the fixed element of the corresponding jack.

17. The apparatus of claim 14, wherein the or each cavity of the mobile body may be placed in a third position located upstream of the first position, for which third position said cavity is opposite means for supplying the pressure chamber with matter to be treated.

18. The apparatus of claim 1 for the treatment of household garbage for manufacturing an organic product and a fuel.

19. The apparatus of claim 1 for the treatment of meat for manufacturing a paste.

20. The apparatus of claim 1 for the treatment of fragments of green trees of bushes for manufacturing a dry oversize rich in cellulose and a liquor rich in organic matter.

21. The apparatus of claim 1 for the treatment of rapid-growth plants such as great reed or sorghum for eliminating the pith of these plants in the sifted matter and manufacturing an oversize rich in cellulose fibres.

22. The apparatus of claim 1 for the treatment of marrow bone for extracting the marrow.

23. The apparatus of claim 13, wherein the sliding face of each punch of a complex crushing member comprises a longitudinal collecting groove into which open a plurality of transverse channels, said collecting groove opening on one side into a chamber for recovering the sifted matter and being closed on the other side.

24. The apparatus of claim 1 for the treatment of household garbage for manufacturing an organic product and a fuel, wherein a crushing member is used which is provided with channels whose depth is between 2 and 30 mm and the household garbage is compressed at pressures of between 500 and 2000 bars.

* * * * *